United States Patent [19]
Redlich

US005753985A

[11] Patent Number: 5,753,985
[45] Date of Patent: May 19, 1998

[54] ELECTRIC MOTOR WITH OSCILLATING ROTARY OUTPUT AND CONTROLLED AMPLITUDE

[76] Inventor: Robert W. Redlich, 9 Grand Park Blvd., Athens, Ohio 45701

[21] Appl. No.: 778,963

[22] Filed: Jan. 6, 1997

[51] Int. Cl.⁶ ............................................. H02K 35/00
[52] U.S. Cl. ...................... 310/36; 310/15; 310/36; 310/39; 310/259; 310/266; 310/156; 318/119; 318/127; 318/128
[58] Field of Search ................ 310/36, 39, 15, 310/259, 266, 156; 318/119, 127, 128

[56] References Cited

U.S. PATENT DOCUMENTS

| | | | |
|---|---|---|---|
| 2,464,320 | 3/1949 | Klinkhamer | 172/36 |
| 3,475,629 | 10/1969 | Lagier | 310/36 |
| 3,900,749 | 8/1975 | Carriker | 310/156 |
| 4,038,588 | 7/1977 | Woolfson et al. | 318/648 |
| 4,433,261 | 2/1984 | Nashiki et al. | 310/156 |
| 4,583,027 | 4/1986 | Parker et al. | 318/128 |
| 4,811,835 | 3/1989 | Bullivant et al. | 198/762 |
| 5,038,064 | 8/1991 | Fiorenza | 310/116 |
| 5,496,153 | 3/1996 | Redlich | 417/212 |
| 5,598,070 | 1/1997 | Coleman | 318/127 |

*Primary Examiner*—Thomas M. Dougherty
*Assistant Examiner*—K. Eizo Tamai
*Attorney, Agent, or Firm*—Frank H. Foster; Kremblas, Foster, Millard & Pollack

[57] ABSTRACT

Disclosed is an AC electric motor with oscillating rotary output, a permanent magnet rotor having radially magnetized magnets, and feedback control of oscillation amplitude. Amplitude control is accomplished without a separate amplitude sensor by using an accurate model of the motor as a basis for calculation of amplitude from measurements of motor voltage and current. The motor has high efficiency, low inertia, and uses a relatively small volume of permanent magnet per unit power output.

12 Claims, 7 Drawing Sheets

ELECTRIC MOTOR WITH OSCILLATING ROTARY OUTPUT AND CONTROLLED AMPLITUDE

TECHNICAL FIELD

This invention relates to electric motors and more particularly relates to an electric motor having an oscillating rotary motion (i.e. alternating rotation about an axis through a displacement angle in one direction and then a displacement angle in the opposite direction), and a control system providing variable control of these displacement angles.

BACKGROUND ART

An AC motor with oscillating rotary output and controllable amplitude can be used advantageously in variable flow rate compressors for refrigeration and air conditioning. Such compressors can save energy by changing the flow of refrigerant in response to changing heat load. For such applications, desirable properties of the motor are; efficiency above 90% at rated power, high efficiency well below rated power, small size, low cost, simple construction, low moment of inertia of rotating parts, capability for inexpensive amplitude control, and the ability to use the motor itself as an amplitude sensor in order to avoid the complication and cost of a separate amplitude sensor. The disclosed motor has all these attributes, and can be built in sizes ranging from a few watts to at least 10 kw. The disclosed motor can be used as an amplitude sensor because the motor is accurately described by a simple model that can be the basis for an analog or digital computation of angular position from measurements of motor voltage and current.

It is advantageous to minimize the space occupied by motors for air conditioners and refrigerators. An object of the invention is therefore to provide a motor having high [power/(motor volume)] ratio. Since magnets are by far the most expensive component of any permanent magnet motor, another object of the invention is to maximize the ratio [power/(magnet volume)]. A motor according to the invention realizes both high [power/(motor volume)] and high [power/(magnet volume)] because the magnets operate at a point on their demagnetization curve that allows high fields to be generated by the winding in the gap occupied by the rotor without causing irreversible demagnetization of the rotor and without degrading power factor, and because the angular velocity of the rotor exceeds the angular frequency of the AC driving source if the rotor rotates through a peak angle exceeding 1.0 radian.

Because applications like domestic refrigeration and air conditioning are cost sensitive, another object of the invention is to provide a motor of simple construction using inexpensive materials (excepting the magnets).

For most applications, rotor inertia must be mechanically resonated by a torsion spring to achieve acceptable power factor, and it is advantageous to minimize rotor inertia in order to reduce the spring length and to make the spring constant less critical. Another object of the invention is therefore to minimize rotor inertia.

In application of the rotary, oscillating motor to variable flow compressors, peak oscillation amplitude must be changed in response to changes in quantities such as pressure or temperature, by means of a feedback control. Such control requires sensing of actual peak amplitude for comparison with the amplitude currently needed. For this purpose, use of a separate amplitude sensor increases cost and reduces reliability. It is therefore another object of the invention to provide a motor which can itself be used as a sensor. A motor according to the invention can be used as a practical sensor because its equivalent circuit is simple and accurate, and thus can be the basis for an inexpensive analog or digital calculation of peak angular displacement from measurements of motor voltage and current.

In the prior art an AC motor having oscillating rotary output and a permanent magnet rotor is disclosed in U.S. Pat. No. 3,475,629, but differs from the invention in, among other things, that its rotor is a solid cylindrical permanent magnet, magnetized parallel to a diameter. Such construction, though simple and cheap, has unfavorable consequences as follows, Rotor inertia for a given power output is high compared to a hollow rotor according to the invention.

Since the rotor is a solid cylinder, in contrast to the invention which has a hollow cylindrical rotor, none of the armature iron structure can be positioned inside the rotor as in the invention. This causes a large effective air gap, so that high armature currents are needed per unit of armature flux through the rotor, thus requiring a bulky winding to avoid extreme inefficiency. It can also be shown that a large air gap implies a poor power factor.

Magnetization of the rotor parallel to a diameter leads to reduced torque generation per unit of armature flux for those parts of the rotor near the edges of the armature iron. The volume of permanent magnet per unit of power output, must, for this reason, be higher than that required by the invention, in which all parts of the rotor are equally effective for torque generation.

As a consequence of magnetization parallel to a diameter, there is no simple relationship between "back EMF" and rotor angular velocity. Thus there is no simple way of using the motor itself as an amplitude transducer.

Because the rotor is solid, the permanent magnet material of the rotor operates in a high demagnetizing H field, so that it is vulnerable to irreversible demagnetization by excessive armature current. In the invention, the rotor material operates at low demagnetizing field and consequently is resistant to irreversible demagnetization.

U.S. Pat. No. 5,496,153 discloses a method of controlling the position of a free piston driven by a permanent magnet linear motor. According to U.S. Pat. No. 5,496,153 the motor itself is used as a sensor by means of a computation based on the equivalent circuit of the motor and measurements of motor voltage and current. The inventive steps that distinguish the present invention from U.S. Pat. No. 5,496,153 are; first, recognition that the equivalent circuit of a rotary motor according to the present invention has the same form as that of a permanent magnet linear motor except that angular velocity takes the place of linear velocity, and second, that the computations described in U.S. Pat. No. 5,496,153 can be greatly simplified in the case of rotary motion because there is no average component of angular displacement and, therefore, only the oscillating component of angular motion need be calculated.

BRIEF DISCLOSURE OF INVENTION

The invention is an angularly oscillating, rotary electric motor powered by a source of alternating voltage. The motor has a ferromagnetic stator structure with an interior, cylindrical opening extending longitudinally along a central axis. Longitudinally extending armature winding slots are formed into the cylindrical opening on opposite sides of the stator. An armature winding is wound in the slots and has conductors wound for directing the current in the conductors of opposite slots in longitudinally opposite directions. A rotor is mounted in the interior opening for oscillating rotary motion. The rotor has a substantially cylindrical, coaxial exterior wall and a substantially cylindrical, coaxial interior wall. The rotor comprises at least two abutting, permanent magnet segments on opposite sides of the axis. One magnet segment is magnetized radially inwardly and the opposite segment is magnetized radially outwardly. A ferromagnetic core structure is positioned within the rotor.

According to the invention, torque is exerted on a permanent magnet rotor that has the form of a hollow circular cylinder divided by a diametral plane into two half-cylinders, one magnetized radially inward, the other radially outward. Torque results from interaction of axially directed equivalent magnetization currents at the interfaces between rotor halves and an alternating radial magnetic field in an annular air gap containing the rotor. The alternating field is generated by alternating current in a winding, and is channeled into the annular air gap by a laminated structure made of high permeability electrical steel. The laminated structure forms the boundaries of the annular air gap, and contains the winding within slots in the structure. Torque on the rotor changes direction in synchronism with alternating current in the winding. Therefore the rotor oscillates with peak angular displacement that depends on the load connected to the rotor, the applied voltage, the inductance and resistance of the winding, and the inertia of the rotor.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art. In addition, a circuit is illustrated having components which perform mathematical operations on electronic signals.

Those skilled in the art will recognize that there are many, and in the future may be additional, alternative circuits which are recognized as equivalent because they provide the same operations on the signals. Further, those skilled in the art will recognize that, under well known principles of computer hardware and software design, mathematical operations may be performed in numerous alternative equivalent ways.

DETAILED DESCRIPTION

Figure 1:
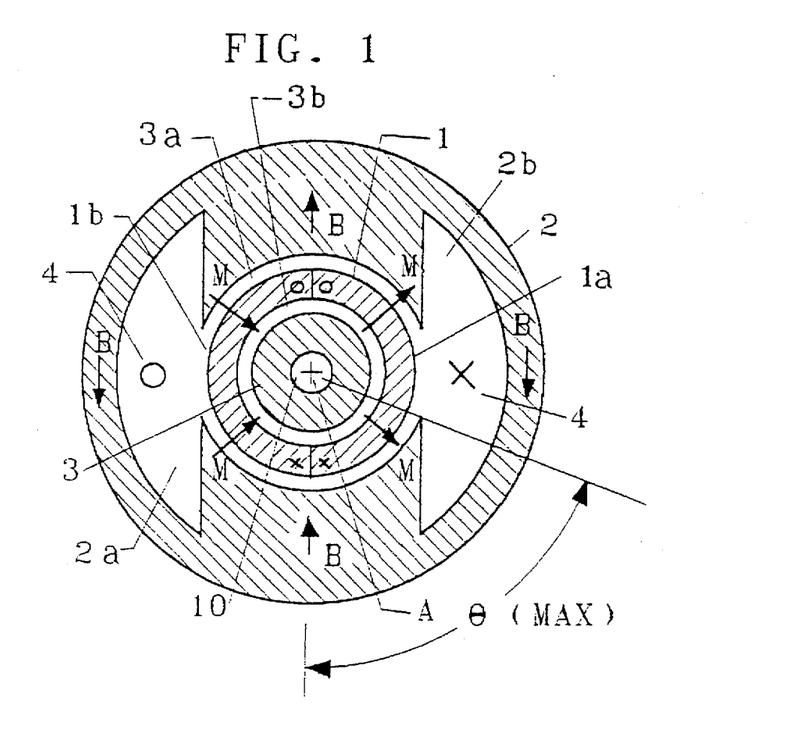
FIG. 1 is a cross sectional view, perpendicular to the rotation axis, of a motor according to the invention.

In FIG. 1, A is the axis of rotation of permanent magnet rotor 1, which is divided into two halves 1A and 1B, one magnetized radially inward, the other radially outward. Directions of magnetization are indicated in FIG. 1 by arrows labeled M. The magnetization is maintained as radial along the entire angular interval occupied by each magnet and is not merely parallel to one single radial from the axis. Outer stator structure 2 and inner core structure 3 are stationary outer and inner structures respectively, each made of electrical steel laminations stacked along axis A. Inner core structure 3 has a cylindrical, hollow cavity 10 which extends axially. Structures 2 and 3 define air gaps 3A and 3B in the form of two annular cylindrical air gap segments spaced 180 degrees apart around axis A and coaxial with A. Rotor 1 rotates within the air gaps defined by structures 2 and 3.

An armature winding 4 of electrically conducting wire is placed in slots 2A and 2B formed in stator structure 2 that are positioned 180 degrees apart around axis A. The wire of winding 4 is wound so that if electric current flows in it, the direction of flow is axial and in opposite directions in the two slots 2A and 2B formed in structure 2, as indicated in FIG. 1 by the symbols X and O. X denotes flow into the plane of FIG. 1, O denotes flow out of that plane. If the current in winding 4 is alternating, X and O change sequentially at the frequency of alternation.

At the interfaces between the two halves 1A and 1B of rotor 1, it is known from basic electromagnetic theory that a surface density J of electric current exists equal to [M cross n], where M is the magnetization vector, n is a unit vector normal to the interface, and "cross" means vector cross product. Since M is radial and n is tangential, J is axial. Both M and n of the two rotor halves at a particular interface are in opposite directions, therefore current surface density J contributed by one half at a given interface is in the same direction as current surface density J contributed by the other half. This is indicated in FIG. 1 by the symbols xx and oo, which denote J out of and in to the plane of FIG. 1 respectively.

The physical mechanism causing a torque on rotor 1 can now be made apparent. When current flows in winding 4, it generates a magnetic field in structures 2 and 3, and in the air gap. The direction of this field is indicated in FIG. 1 by arrows labeled B. In the top and bottom air gaps, B is radially outward and inward respectively. From electromagnetic theory, the force per unit area on the surface current densities J is equal to [J cross B]. Since J is axial and B is radial, the force is tangential, and the direction of the force is opposite for upper and lower interfaces. Therefore there is a torque on rotor 1 which changes direction as the current in winding 4 changes. For a given current in winding 4, the torque on rotor 1 is not altered by rotation of rotor 1 provided that the interfaces between rotor halves remain within the air gaps. Torque T and current I are proportional with a proportionality constant denoted by $\beta$, that is;

$$T = \beta \times I \qquad \text{(equation 1)}.$$

It can be shown from energy conservation that the same proportionality constant β relates the voltage V induced by the rotor magnets in winding 4 to motion of the rotor at angular velocity ω, that is, $$V = \beta \times \omega \qquad \text{(equation 2).}$$

Equation 2 will be referred to later in connection with control of the amplitude of motor oscillation.

According to equation 1, if I is a sinusoidal function of time, T will also be a sinusoidal function of time and will cause the rotor 1 to oscillate with some amplitude denoted hereafter as θ. Angular amplitude θ depends on the amplitude of current I and on the load connected to rotor 1. Maximum allowable θ occurs when the interface between the halves of rotor 1 begins to leave the air gap, and is denoted in FIG. 1 by θ(max.).

If the only load connected to rotor 1 is its own moment of inertia (denoted hereafter by Γ), then from equation 1 and the dynamics of rotating objects, in order to sustain an oscillation through θ at frequency ω a current I(min.) equal to $$\theta \times \frac{\Gamma \times \omega^2}{\beta}$$

must flow in winding 4. Since no energy is absorbed if the only load on the rotor is its own inertia, I(min.) is a reactive current which will add to any current drawn as a consequence of adding useful load to the rotor. Thus, I(min.) degrades power factor and efficiency. To eliminate it, it is desirable to mechanically resonate the mass of the rotor having a moment of inertia Γ with a torsion spring mechanically linked between the rotor 1 and the stator structure 2 and having a constant K according to the equation:

$$K = \Gamma \times \omega^2$$

Figure 2:
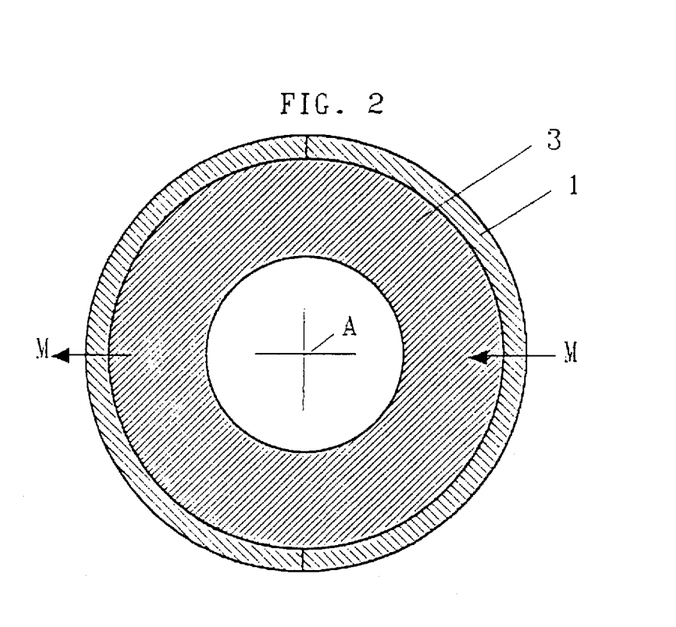
FIG. 2 is a cross-sectional view, perpendicular to the axis of rotation, of a particular embodiment of a rotor according to the invention, in which the inner part of a laminated flux carrying structure is attached to the permanent magnet part of the rotor and moves with it, in contrast to the embodiment of FIG. 1 which has stationary inner laminated structure.

If Γ is large, K will be large, the required torsion spring will be bulky, and the exact value of K will be critical. Therefore, it is desirable to minimize Γ. For this reason, the inner structure 3, as shown in FIG. 1, is not attached to rotor 1 and remains stationary as the rotor oscillates, since otherwise it would increase Γ. However, if inner structure 3 is attached to rotor 1, construction is simplified and the penalty incurred by increasing Γ may be acceptable. Such construction is shown in FIG. 2.

Figure 3:
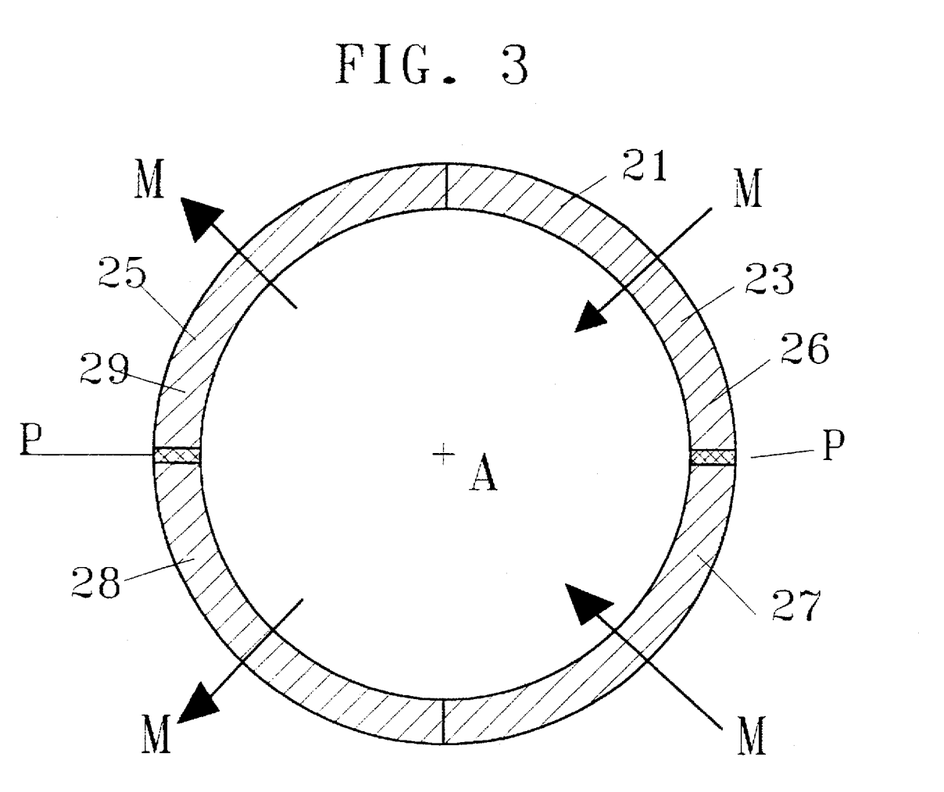
FIG. 3 is a cross-sectional view, perpendicular to the axis of rotation, of a particular embodiment of a permanent magnet rotor according to the invention, in which the rotor is divided into subsegments insulated from each other, for the purpose of suppressing eddy current power loss in the permanent magnets.

Strong, high energy permanent magnets, such as are advantageous for use in the invention in order to minimize Γ and motor volume, are electrical conductors. Eddy currents will therefore be induced in rotor 1 as it oscillates and can cause unacceptably high power loss as well as increasing the risk of demagnetization as a result of rotor heating. To suppress eddy currents, each of the two rotor halves can be broken up into a plurality of subsegments, for example two segments each as shown in FIG. 3, which shows a rotor 21 with each of its two segments 23 and 25 having two subsegments labelled 26, 27, 28 and 29 per rotor half, abutting at interfaces P. The subsegments may be insulated from each other by a layer of paint or glue on P. The quality of insulation is not critical since it is only necessary to substantially increase the resistance of the interface compared to a continuous magnet.

The magnets can be physically spaced more than is necessary to insulate them for suppressing eddy currents. However, doing so reduces the power rating of the motor and therefore degrades performance. Therefore, the term "abutting" includes a substantial spacing or significant gap between the magnets.

In variable flow rate compressors using a motor as disclosed here, feedback control of oscillation amplitude (designated hereafter by θ) is advantageous and requires knowledge of the existing value of θ for comparison with a required value of θ (designated hereafter by θ (set point)).

Figure 4:
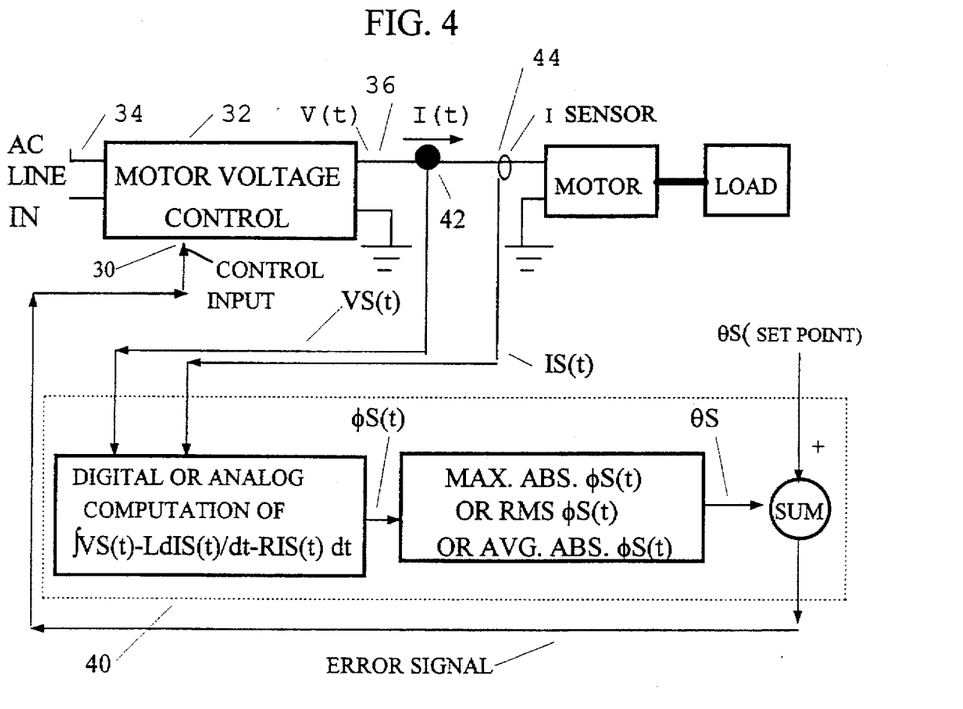
FIG. 4 is a block diagram of a feedback controller for the purpose of controlling peak amplitude of oscillation of a motor according to the invention, in which the motor itself is used as a sensor for indirect measurement of existing peak amplitude.

FIG. 4 is a block diagram that shows how the existing value of θ can be determined from a simple analog or digital computation based on accurately known properties of the motor and measurements of motor voltage and current. The motor has a winding inductance in henries which will be symbolized by L and a winding resistance in ohms symbolized by R, and has a time varying voltage V(t) applied to it, where t denotes time, and a time varying current I(t) flowing in its winding. According to equation 2 and adding the reactive and resistive impedance of the winding, it follows that, $$V(t) = \beta \times \omega + L(dI/dt) + IR \qquad \text{(equation 2A).}$$

The angular displacement of the rotor is a function of time which will be designated as Φ(t). Since ω=dΦ(t)/dt, it further follows from equation 2A that, $$\Phi(t) = (1/\beta) \times \int [V(t) - L\,dI/dt - IR]\,dt \qquad \text{(Equation 3)}$$

θ is the largest value of Φ(t) and is inherently positive. Therefore, $$\theta = \text{maximum absolute value of } \Phi(t) \qquad \text{(equation 4).}$$

In practice, Φ(t) will be very nearly a sinusoidal function of time, in which case θ as determined by equation 4 will be proportional to both the root mean squared and the average absolute values of Φ(t), so that θ can alternatively be found from either of the following two equations, $$\theta = 1.414 \times (\text{root mean squared value of } \Phi(t)) \qquad \text{(equation 4a)}$$

$$\theta = 1.571 \times (\text{average of absolute value of } \Phi(t)) \qquad \text{(equation 4b)}$$

In practice, a computation of θ uses digital numbers or analog voltages that are proportional to the quantities that they represent. Denoting the quantities used in a practical computation by the suffix S after the quantity they represent, for example VS(t) is the computational quantity representing applied voltage V(t), the computation of a quantity proportional to θ is summarized by the following four equations;

$$\Phi S(t) \int [VS(t) - L\,dIS(t)/dt - R \times IS(t)]\,dt \qquad \text{(equation 5a)}$$

θS may be computed from ΦS(t) from any one of the following three equations, $$\theta S = \text{maximum absolute value of } \Phi S(t) \qquad \text{(equation 6a)}$$

$$\theta S = \text{root mean squared value of } \Phi S(t) \qquad \text{(equation 6b)}$$

$$\theta S = \text{average absolute value of } \Phi S(t) \qquad \text{(equation 6c)}$$

An error signal is then calculated by subtracting θS from the currently required value of θS, which is labeled as θS SET POINT in FIG. 4. The error signal is applied to the control terminal 30 of a motor voltage control 32 whose input 34 is AC line voltage and whose output 36 is a variable AC voltage that increases if the error signal increases. Typical motor voltage control means are Triacs and pulse width modulated inverters that generate controllable amplitude AC from rectified line voltage.

The motor voltage signal is applied to an analog or digital computer 40 through a voltage sensor 42 which can be a conductor, or can also include an interposed voltage scaling circuit and/or an A/D converter. If the motor has a sufficiently low voltage, for example 10 volts, and an analog computing circuit is used, the only sensor needed is a conductor to deliver the signal to the analog computing circuit. The motor current signal is applied to the computer 40 from a current sensor 44 which can also include an interposed current scaling circuit and/or an A/D converter.

Figure 5:
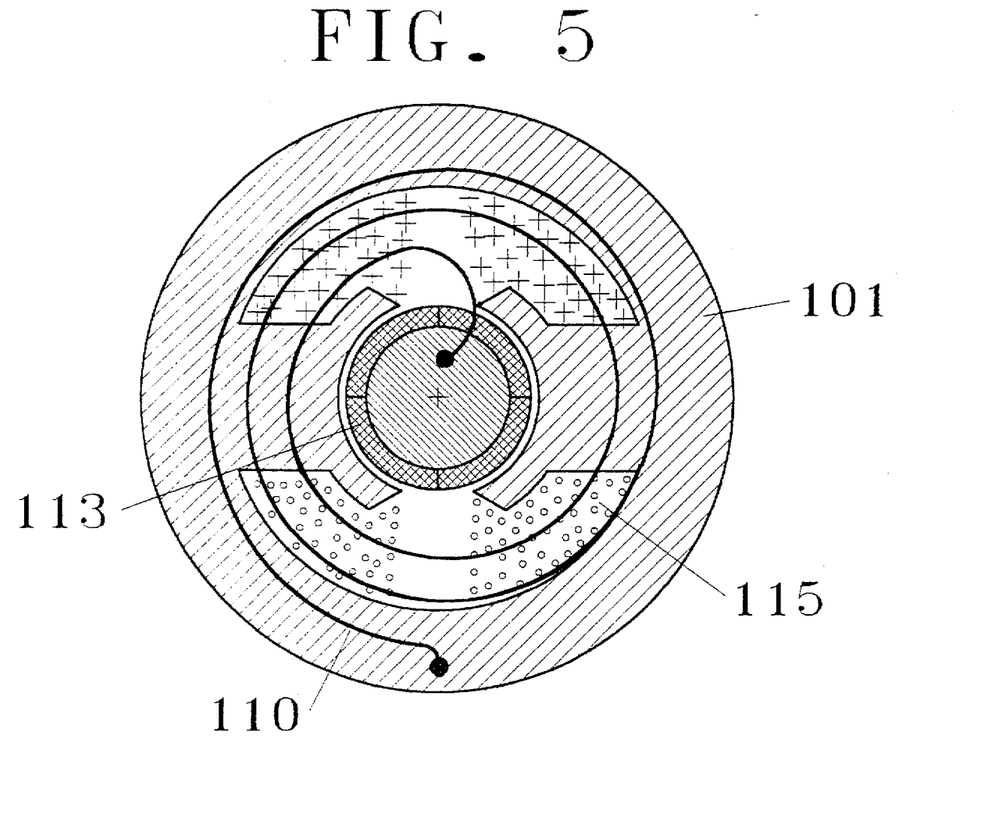
FIG. 5 is a view in cross section of an embodiment illustrating a preferred configuration of an embodiment of the invention.

FIG. 5 illustrates a preferred embodiment which is designed to operate at 60 Hz. The FIG. 5 embodiment operates at 1 kw and uses Ne—Fe magnets, 28 mg.-oe. Its power factor at rated load is 0.85 and it has an efficiency at rated load of 92%. Its outside diameter is 72 mm and the length of the lamination stack is 170 mm. The magnet mass is 205 grams and its oscillation amplitude maximum is 70 degrees. The torsion spring to resonate the rotor magnets is 2.9 nm/rad.

FIG. 5 also illustrates a torsion spring 110 linked between the stator 101 and the rotor 113. The spring 110 has a spring constant for resonating the rotor 113, and any mass drivingly connected to the rotor, at the frequency of the alternating voltage applied to the armature winding 115.

Figure 6:
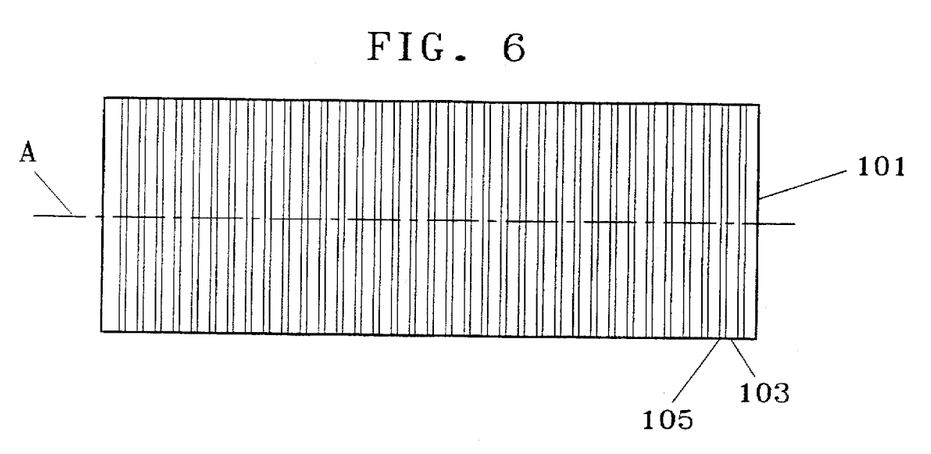
FIG. 6 is a side view of the embodiment in FIG. 5.

FIG. 6 illustrates a side view of the embodiment of FIG. 5. It shows the stator structure 101, comprising a plurality of laminations 103, stacked along the axis A, and separated by electrical insulation 105.

Figure 7:
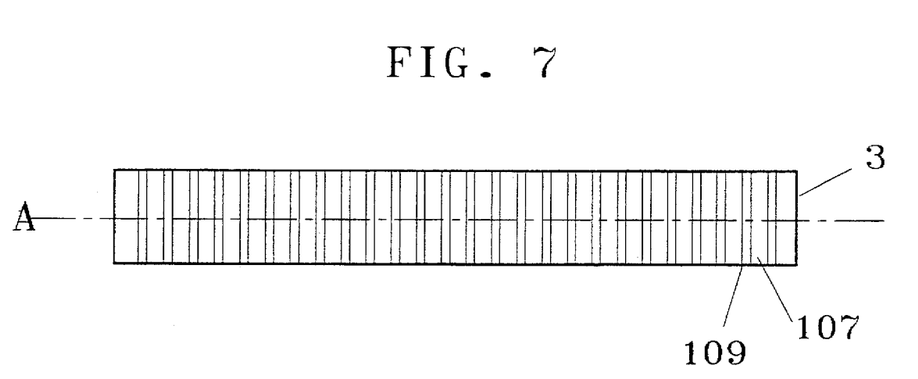
FIG. 7 is a side view of the core 3 illustrated in FIG. 1.

FIG. 7 illustrates a side view of the core 3 of FIG. 1, which comprises a plurality of laminations 107 stacked along the axis A and separated by electrical insulation 109.

While certain preferred embodiments of the present invention have been disclosed in detail, it is to be understood that various modifications may be adopted without departing from the spirit of the invention or scope of the following claims.

I claim:

1. An angularly oscillating, rotary AC electric motor powered by a source of alternating voltage and comprising:
   (a) a ferromagnetic stator structure having an interior cylindrical opening extending longitudinally along a central axis and having longitudinally extending armature winding slots formed on opposite sides of the stator;
   (b) an armature winding in the slots having conductors wound for directing current in the conductors of opposite slots in longitudinally opposite directions;
   (c) a rotor having an axis of rotation and mounted in the interior opening for oscillating rotary motion, the rotor having a substantially cylindrical, coaxial exterior wall and a substantially cylindrical, coaxial interior wall, the rotor comprising at least two abutting permanent magnet segments on opposite sides of the axis, one magnet segment magnetized substantially radially inwardly along its entire angular interval and the other magnet segment magnetized substantially radially outwardly along its entire angular interval;
   (d) a ferromagnetic core structure positioned within the rotor and;
   (e) a feedback controller for controlling the motor amplitude $\Theta$ wherein the armature winding has an inductance L and a resistance R, said controller comprising:
      (A) a voltage sensor for providing an output signal representing the instantaneous voltage VS(t) applied to the armature winding;
      (B) a current sensor for providing an output signal representing the instantaneous current IS(t) through the armature winding
      (C) a computer apparatus for computing:
         (i) the instantaneous angular displacement $\Phi S(t)$ of the rotor in accordance with the equation:

$$\Phi S(t) = \int [VS(t) - L \times dIS(t)/dt - R \times IS(t)] dt;$$

(ii) the rotor amplitude $\Theta$ in accordance with at least one of the equations:

$\Theta S$ = maximum absolute value of $\Phi S(t)$, $\Theta S$ = average of the absolute value of $\Phi S(t)$ and $\Theta S$ = root mean squared value of $\Phi S(t)$;

and
         (iii) an error signal as the difference between the required set point value of rotor amplitude and the computed value of rotor amplitude $\Theta$; and
      (D) an alternating voltage controller circuit having a power input connected to a source of alternating voltage, a controlled voltage output connected to the armature winding and a control input for receiving the error signal and increasing the controlled output voltage when the error signal increases and decreasing the output voltage when the error signal decreases.

2. A motor in accordance with claim 1 wherein the winding slots are formed into walls of the interior opening of the stator on opposite sides of the axis.

3. A motor in accordance with claim 2 wherein the core structure has an axial cavity.

4. A motor in accordance with claim 2 wherein the rotor is attached to and rotates with the core structure.

5. A motor in accordance with claim 4 wherein the core structure has an axial cavity.

6. A motor in accordance with claim 2 wherein the magnet segments abut along opposite longitudinal interfaces.

7. A motor in accordance with claim 6 wherein each of the magnet segments is subdivided into angular subsegments for suppressing eddy currents and wherein the segments and subsegments are separated by electrical insulation along longitudinal interfaces.

8. A motor in accordance with claim 7 wherein the magnet segments and the magnet subsegments interface along radial planes.

9. A motor in accordance with claim 2 wherein the stator and core structures each comprise a plurality of laminations stacked along the axis and separated by electrical insulation.

10. A motor in accordance with claim 9 wherein the laminations are electrical steel.

11. A motor in accordance with claim 1 wherein a torsion spring is linked between the stator and the rotor, the spring having a spring constant for resonating the rotor and any mass drivingly connected to the rotor at the frequency of the alternating voltage.

12. An angularly oscillating, rotary, AC electric motor having an axis of rotation and comprising:
   (a) a stator having electrical steel laminations stacked along the axis, the stator having an interior cylindrical opening coaxial with the axis and having armature winding slots formed on opposite sides of the axis and extending parallel to the axis;

(b) an armature winding in the slots having conductors wound for conducting alternating electrical current in the conductors of opposite slots in longitudinally opposite directions;

(c) a rotor mounted in the interior opening for oscillating rotary motion around the axis, the rotor comprising
  (i) a cylindrical core of electrical steel laminations stacked along the axis;
  (ii) at least four, abutting, arcuate permanent magnet segments mounted to the exterior of the core, each segment separated from adjacent segments by electrical insulation, the segments on one side of the axis being magnetized radially inwardly and the segments on the opposite side of the axis being magnetized radially outwardly ;and (d) a feedback controller for controlling the rotor amplitude wherein the armature winding has an inductance L and a resistance R, said controller comprising:
  (A) a voltage sensor for providing an output signal proportional to the instantaneous voltage VS(t) applied to the armature winding;
  (B) a current sensor for providing an output signal proportional to the instantaneous current IS(t) through the armature winding;
  (C) a computer apparatus for computing:
    (i) the instantaneous angular displacement Φs (t) of the rotor in accordance with the equation:

$$\Phi S(t) = \int [VS(t) - L \times dIS(t)/dt - R \times IS(t)]dt;$$

(ii) the rotor amplitude θ in accordance with at least one of the equations:

θ=maximum absolute value of ΦS(t),

θ=average of the absolute value of ΦS(t).

and

θ=root mean squared value of ΦS(t);

and (iii) an error signal as the difference between a required set point value of rotor amplitude and the computed value of rotor amplitude θ; and
  (D) an alternating voltage controller circuit having a power input connected to a source of alternating voltages a controlled voltage output connected to the armature winding and a control input for receiving the error signal and increasing the controlled output voltage when the error signal increases and decreasing the output voltage when the error signal decreases.

* * * * *